(No Model.)
J. KING.
CAR STARTER.
No. 321,225. Patented June 30, 1885.
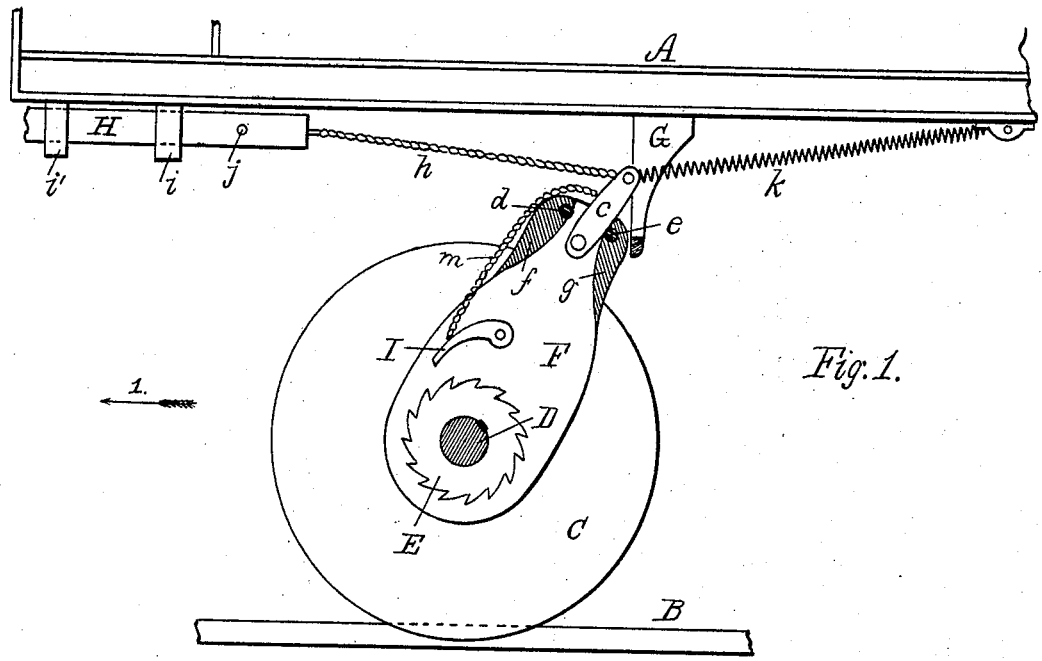
Fig. 1.
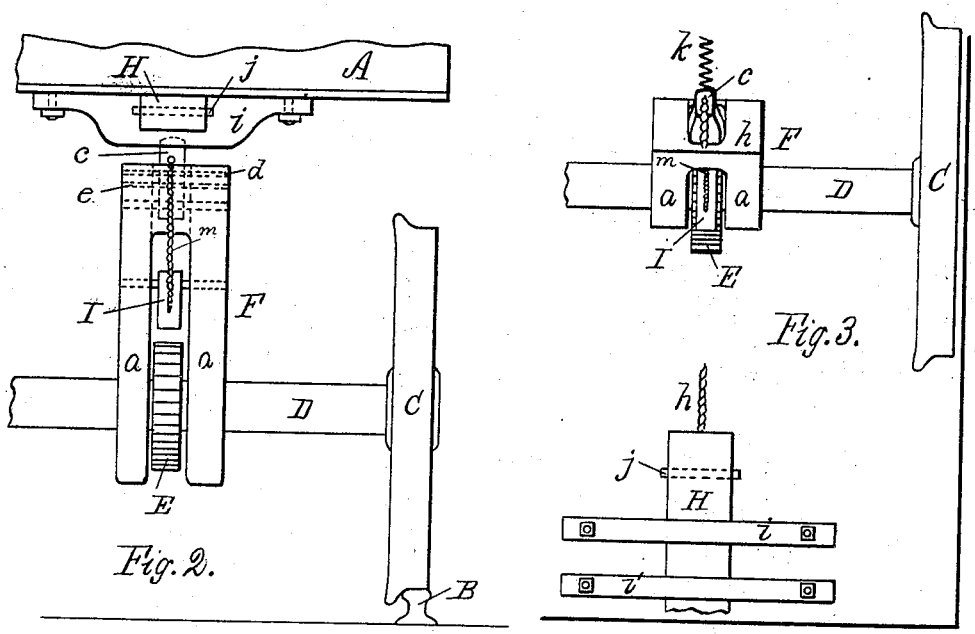
Fig. 2.
Fig. 3.
Witnesses.
H. E. Lodge
A. F. Hayden
Inventor.
John King.
F. Curtis. Atty.

UNITED STATES PATENT OFFICE.

JOHN KING, OF MEDWAY, MASSACHUSETTS.

CAR-STARTER.

SPECIFICATION forming part of Letters Patent No. 321,225, dated June 30, 1885.

Application filed May 15, 1885. (No model.)

*To all whom it may concern:*

Be it known that I, JOHN KING, a citizen of the United States, residing at Medway, in the county of Norfolk and State of Massachusetts, have invented certain new and useful Improvements in Car-Starters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to car-starters, so called from their peculiar mechanical arrangement, by which a very much increased leverage, induced by the draft, is exerted upon the axle, whereby the inertia of the car and its load is partially overcome when in the act of starting.

My present invention belongs especially to that class in which a ratchet-wheel securely affixed to the axle of the car or other vehicle is adapted to engage with a pawl attached to a lever operated by and connected with the draw-bar.

The particular object of my invention is to simplify and reduce the number of parts and still maintain efficiency, combined with small expense in manufacturing. In the present instance my invention consists in the peculiar arrangement, adaptation, and general operation of the parts as an entirety.

In the drawings accompanying this specification I have shown, in Figure 1, a sectional elevation of a portion of a car to which is attached an apparatus embodying my invention. Fig. 2 is an end elevation, and Fig. 3 a plan of the same device.

In the above drawings, A represents the floor of one end of a horse-car, since this device is especially adapted to cars of this description, owing to the frequency with which they are stopped and started. B is the rail, and C the wheel secured to the axle D. Centrally or thereabout upon the said axle I have secured rigidly, by means of a spline and groove or other suitable connection, a ratchet-wheel, E. Furthermore, I have disposed a rocking inverted-U-shaped lever, F, the legs $a\,a$ of which are bored and loosely fitted upon the axle, which maintains it in position. The legs of the lever F span the ratchet-wheel.

At the top of the U-lever F, I have formed a slot, $b$, and pivoted therein one end of a shipper-bar, $c$, the travel or throw of which is limited by two bars, $d\,e$, secured upon either side of it and attached to the lever F, this shipper-bar being located in vertical alignment with the ratchet-wheel. In lieu of the rods or bars $d\,e$, blocks or stops $f\,g$, formed upon the lever, may be substituted therefor and answer equally well. The limit of the backward throw of the lever F, supposing the car is traveling in the direction of arrow 1 in Fig. 1, is effected by the stop or bunter G.

To the upper end of the shipper-bar $c$, I have affixed a stout chain or rod, $h$, secured to the draw-bar H, the latter moving in proper guides $i\,i'$, and its travel being limited by the stop $j$. Moreover, at the same point upon the shipper-bar I have secured one end of a coiled spring, $k$, oppositely disposed from the rod or chain $h$ and rigidly fastened at its other end beneath the car.

The pawl I, which actuates and engages with its ratchet-wheel D, is pivoted at $l$, between the legs $a\,a$ of the lever F, and in vertical alignment with but above the top of its ratchet-wheel D. This pawl is attached to the shipper-bar by a rod or chain, $m$, and thus is rendered active or inactive, according to the position of said shipper-bar, so called, since it permits of engagement of the pawl with the ratchet-wheel or disengagement therefrom, according as the draw-bar is active or otherwise.

Having thus described the various component parts and their relative positions and connection with each other, I will now proceed to describe the active operation of an apparatus containing my invention, supposing that the car is at rest and that the normal or inactive position of the parts is as shown in Fig. 1 of the drawings.

Now, when a draft or pull is exerted upon the draw-bar H, and the latter commences to advance in the direction of the strain, the shipper-bar $c$ is also drawn forward against the pressure of the spring $k$, and thus relaxes the chain $m$ attached to said bar and the outer end of the pawl I, and the latter is permitted to drop and thus engage with some one of the teeth of said ratchet-wheel. After release of the pawl into an active position the shipper-bar continues to advance until its further progress is arrested by the pin $d$ or block $f$, when said bar and the lever F act as a unity. As the strain continues the lever F is swung in the same direction, moving on the axle, upon which it loosely plays, and thus carries with it the ratchet-wheel E, now engaged by the pawl I, and said ratchet is compelled to move by means of the leverage of the pawl, lever, and draw-bar, thus forcing the car along and overcoming its inertia. Moreover, this pull or strain upon the draw-bar H continues until the stud or shoulder $j$ has come in contact with the guide-post $i$ and a direct draft, as ordinarily the case, is now exerted upon the car, which readily advances with the impulse already given.

Simultaneously, or thereabout, with the stoppage of the draw-bar, the pawl is disengaged from its ratchet-wheel by the advanced rotation of the axle and wheel, which has carried the pawl into a vertical position, and the latter, induced by gravity, readily drops away from off the periphery of the ratchet.

When the strain or pull upon the draw-bar H ceases upon stoppage of the car, the spring $k$ is released and permitted to resume its normal position, and the tension of such spring draws back the bar H, carrying with it, by means of the chain $m$, shipper-bar $c$, which retreats until stopped by the pin $e$ or block $g$. When this occurs, the bar $c$ and lever F are as one piece, and move together on the reverse or retreat movement until the lever comes in contact with the buffer or stop G, when all the parts have resumed their normal or inactive positions.

It will further be observed that upon cessation of the pull upon the draw-bar and retreat of the latter, due to the rocking movement of the shipper-bar $c$, secured to the spring $k$, the pawl I, which is also secured to said bar $c$, is by motion of the latter lifted and thereby kept from contact with the ratchet-teeth until strain is again brought to bear upon the draw-bar and active operation of the parts ensues.

I claim—

1. In a car-starter, the combination, with the draw-bar, a ratchet-wheel mounted upon the axle, the lever, and pawl secured to the latter, of the shipper-bar, by means of which the pawl engages with the ratchet prior to the advance of the lever, substantially as herein set forth.

2. The combination, with the ratchet-wheel E, lever F, and pawl pivoted thereto, of the spring-actuated shipper-bar $c$, by means of which the pawl I is held disengaged from the ratchet during the retreat movement of the lever, as and for purposes herein described.

3. The combination, with the ratchet-wheel, its pawl, and the shipper-bar, of the stops $d\,e$, whereby the shipper-bar operates the lever F only after the pawl has engaged with or been released from its ratchet, substantially as stated.

In testimony whereof I affix my signature in presence of two witnesses.

JOHN KING.

Witnesses:
FRANCIS W. CUMMINGS,
PALMER A. WOODWARD.